United States Patent [19]

Maggioni et al.

[11] Patent Number: 4,773,712
[45] Date of Patent: Sep. 27, 1988

[54] BRAKE CORRECTOR DEVICE FOR HYDRAULIC BRAKE SYSTEM INCLUDING CONTROL MEMBER RESPONSIVE TO SUSPENSION AIR SPRINGS OF MOTOR VEHICLE

[75] Inventors: Virginio Maggioni, Ponte S. Pietro; Antonio Rapa, Cinisello Balsamo, both of Italy

[73] Assignee: Magneti Marelli S.p.A., Milan, Italy

[21] Appl. No.: 944,111

[22] Filed: Dec. 22, 1986

[30] Foreign Application Priority Data

Dec. 27, 1985 [IT] Italy ................. 68110 A/85

[51] Int. Cl.⁴ .............................................. B60T 8/18
[52] U.S. Cl. ..................................... 303/22.5; 188/195
[58] Field of Search ............... 303/22 A, 22 R, 6 C, 303/6 R, 6 A, 23 R, 23 A, 40; 188/195, 349; 267/64.16

[56] References Cited

U.S. PATENT DOCUMENTS

| | | | |
|---|---|---|---|
| 2,940,796 | 6/1960 | Ortmann et al. | 303/22 A |
| 3,169,800 | 2/1965 | Oberthür | 303/22 A |
| 3,269,782 | 8/1966 | Jolly | 303/22 R X |
| 4,143,925 | 3/1979 | Young | 303/22 R |
| 4,198,101 | 4/1980 | Oberthür | 188/195 X |
| 4,299,428 | 11/1981 | Fauck | 188/195 X |
| 4,548,445 | 10/1985 | Mizusawa et al. | 303/22 A |

*Primary Examiner*—Douglas C. Butler
*Attorney, Agent, or Firm*—Sughrue, Mion, Zinn, Macpeak & Seas

[57] ABSTRACT

Each rear wheel has a respective associated hydraulic brake actuator. A brake corrector device of the variable operating pressure type is connected in the operating circuit for the brake actuator associated with the rear wheels and includes, in known manner, a movable control member for regulating the operating pressure of the corrector in dependence on the force acting thereon. A control device is coupled to the brake corrector and applies to the control member of this corrector a force which is variable in a predetermined manner in dependence on the air pressure in the air springs of the rear suspensions of the motor vehicle.

2 Claims, 2 Drawing Sheets

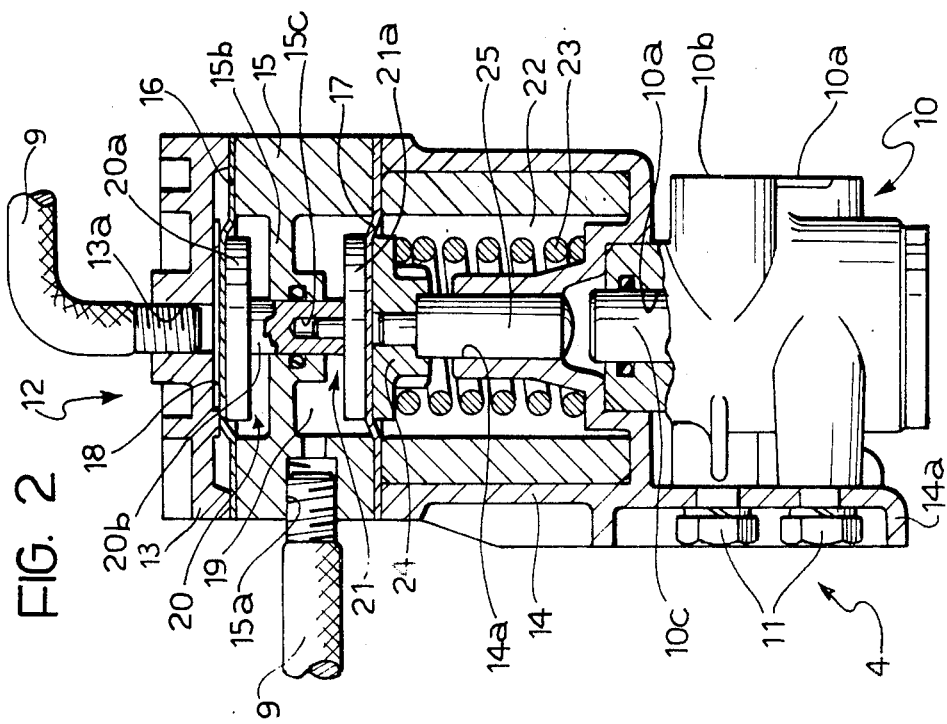
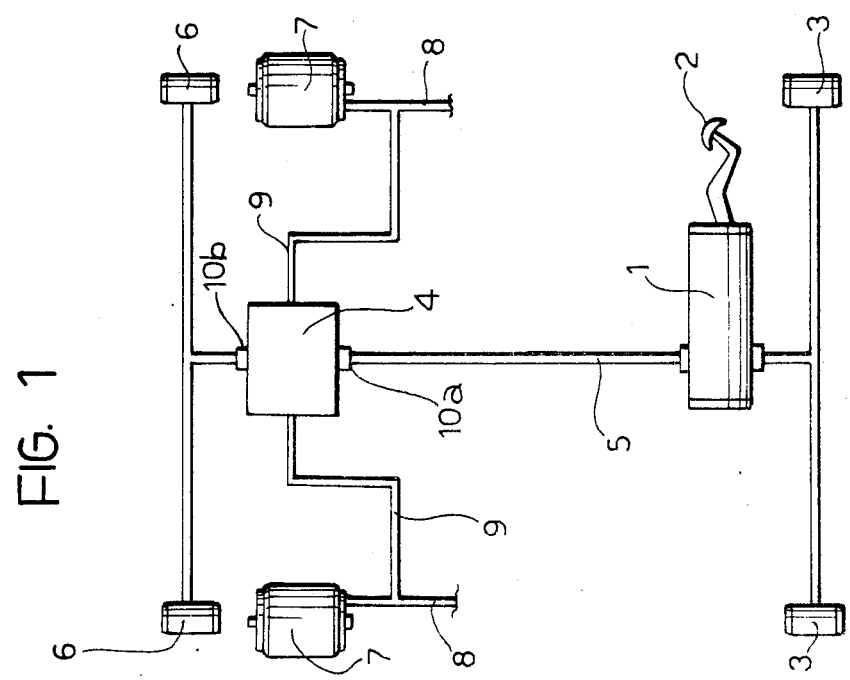

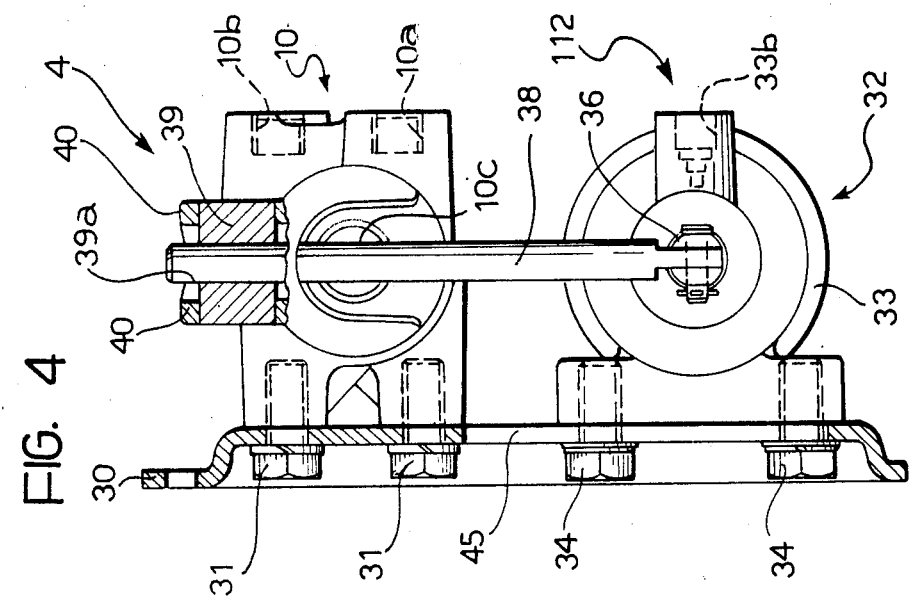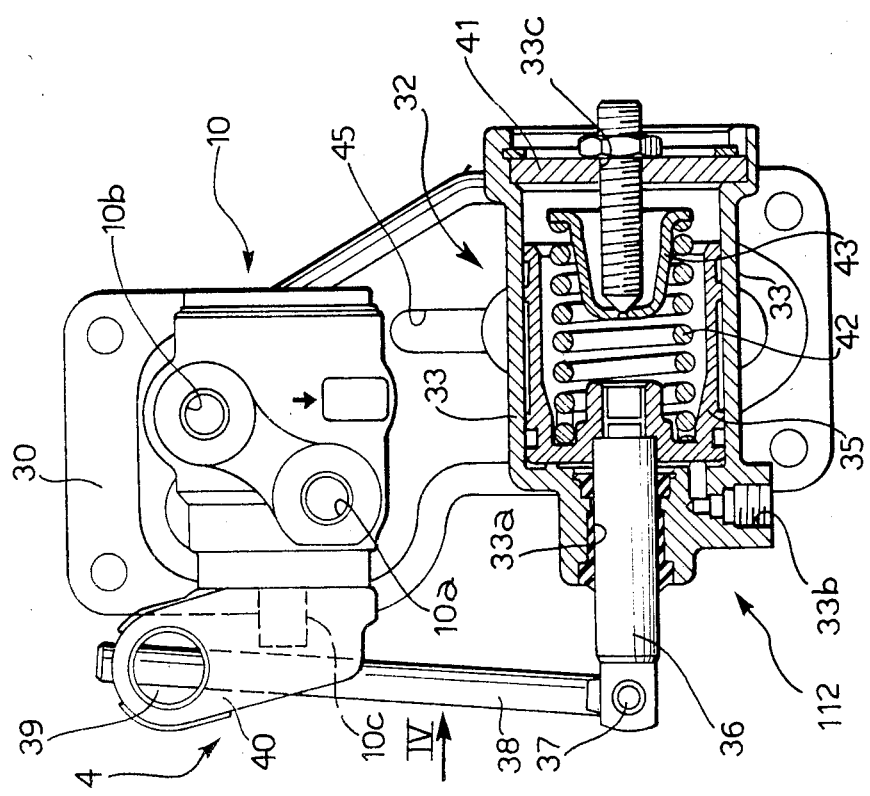

BRAKE CORRECTOR DEVICE FOR HYDRAULIC BRAKE SYSTEM INCLUDING CONTROL MEMBER RESPONSIVE TO SUSPENSION AIR SPRINGS OF MOTOR VEHICLE

DESCRIPTION

The present invention relates to a brake system for motor vehicles having self-levelling suspensions with air springs.

In motor vehicles having self-levelling suspensions, the distance between the suspended parts and the unsuspended parts is practically independent of the conditions of loading of the vehicle. For this reason, it is not possible to use in brake systems for such vehicles conventional brake corrector devices with variable operating pressures which enable the division of the overall braking force between the front and rear axles to the modified in dependence on the different conditions of loading or braking of the vehicle. Typically, in such brake corrector devices the operating pressure is variable in dependence on the load bearing on the rear wheels, the variations in which are detected by means of devices of various types generally sensitive to the variation in the distance between a suspended part and an unsuspended part of the motor vehicle.

The object of the present invention is to provide a brake system for a motor vehicle having self-levelling suspensions with air springs, in which system it is possible to achieve the optimum division of the braking force between the front and rear axles automatically upon variations of the loading conditions.

This object is achieved according to the invention by means of a brake system including a respective hydraulic brake actuator for each rear wheel, characterised in that a brake corrector device of the variable operating pressure type is connected in known manner in the control circuit for the actuators associated with the rear wheels, and includes in equally known manner a movable control member for regulating the operating pressure of the corrector in dependence on the force acting on this member, and in that it further includes control means for applying to the control member of the corrector a force which is variable in a predetermined manner in dependence on the air pressure in the air springs of the rear suspensions of the motor vehicle.

Further characteristics and advantages of the invention will become apparent from the detailed description which follows with reference to the appended drawings, provided purely by way of non-limiting example, in which:

FIG. 1 is a diagram showing a brake system according to the invention,

FIG. 2 is a partial axial sectional view of a device for regulating the braking force, forming part of the brake system shown in FIG. 1, FIG. 3 is a partially sectioned view of a second embodiment of the regulating device forming part of the system of the invention, and FIG. 4 is a partially sectioned view taken on the arrow IV of FIG. 3.

With reference to FIG. 1, a brake system comprises a master cylinder 1 operable by means of a brake pedal 2. The master cylinder is hydraulically connected to brake operating cylinders 3 associated with the front wheels of the vehicle.

A device for regulating the braking force applied to the rear wheels of the motor vehicle is generally indicated 4. This regulating device is connected to the master cylinder 1 through a line 5. The control actuator cylinders 6 associated with the rear wheels of the motor vehicle are connected to this device.

In FIG. 1 the air springs of the self-levelling rear suspensions of the motor vehicle are indicated 7. Pressurised air may be supplied to these springs through respective lines 8 connected to an electric compressor of known type, not illustrated.

Lines 9 have one of their ends connected to the pipelines 8 for supplying air to the springs 7 and their other ends connected to the device 4 for regulating the braking force.

In a first embodiment illustrated in FIG. 2, the regulating device 4 includes a brake corrector 10 of known variable operating pressure type. It has an inlet 10a connected to the master cylinder 1 and an outlet 10b connected to the hydraulic brake actuator 6 for the rear wheels. The movable control member of the brake corrector is indicated 10c and is movable in an aperture 10d in the body of the corrector.

The brake corrector 10 is essentially a pressure limiter with an operating point which is variable in dependence on the position assumed by the control member 10c. The latter has resilient means tending to oppose its movement inwardly of the body of the corrector.

The attachment appendage 14b of a control device, generally indicated 12, is fixed to the body of the corrector 10 by screws 11. This device includes two substantially cup-shaped end bodies 13 and 14 having respective apertures 13a and 14a in their end walls. The upper body 13 has its concavity facing downwardly, while the body 14 has its concavity facing upwardly.

Between the end bodies 13 and 14 is a substantially tubular intermediate body 15 having a lateral aperture 15a. The lines 9 described above are connected to the aperture 13a of the upper body 13 and to the aperture 15a of the intermediate body 15, respectively.

A first diaphragm 16 is clamped between the upper body 13 and the intermediate body 15. A second diaphragm 17 is clamped between the intermediate body 15 and the upper edge of the lower body 14.

Between the body 13 and the diaphragm 16 is a chamber 18 communicating with the line 9 connected to the aperture 13a.

A transverse septum 15b is formed in the tubular body 15. This septum has a central guide aperture 15c. Between the septum 15 and the diaphragm 17 is a further chamber 19 communicating with the line 9 connected to the aperture 15a.

A body 20 includes a rod 20b movable axially through the aperture 15c of the septum 15b, and an end head 20a in the form of a disc disposed against the diaphragm 16 in the region between the diaphragm and the septum 15b.

A body 21 includes a rod 21a movable axially in a central end aperture formed in the end of the rod of the body 20, and a head portion 21a disposed against the diaphragm 17 in the chamber 19.

The region between the diaphragm 17 and the cup-shaped body 14 is indicated 22.

A helical spring 23 is disposed in the region 22 and acts at one end against the end wall of the body 14 and at the other end against an annular body 24 bearing against the lower face of the diaphragm 17.

An actuating rod 25 is movable in the aperture 14a in the cup-shaped body 14 and has one end forcibly inserted in the central aperture in the annular body 24.

The control device 12 is connected to the body of the brake corrector 10 so that the actuating rod 25 faces the control member 10c of the corrector. More particularly, under rest conditions, the spring 23 keeps the actuating rod 25 at a predetermined distance from the control member 10c of the brake corrector 10.

In operation, air is supplied to the chambers 18 and 19 of the control device 12 through the lines 9 at a pressure which is univocally correlated with the pressure in the air springs 7 of the rear suspensions of the motor vehicle.

The static or dynamic variations in the load bearing on the rear axle of the motor vehicle are compensated for by corresponding variations in the pressure of the air in the air springs 7. If a pressure increase in one or both air springs 7 surpasses a threshold value, this causes a corresponding downward movement (for an observer of FIG. 2) of one or both the bodies 20 and 21, and a corresponding movement of the actuating rod 25 towards the control member 10c of the brake corrector 10. The threshold value for the pressure increase in the air springs is determined by the characteristics of the biassing spring 23. The threshold value having been surpassed, the pressure increase in the air springs 7 then causes the application of a correspondingly variable force to the control member 10c of the brake corrector 10. The operation of the latter is thus "modulated"]in dependence on the pressure variations in the air springs 7 and hence in dependence on the variations in the static or dynamic load bearing on the rear wheels.

The control device 12 shown in FIG. 2 thus enables a brake corrector device of conventional type to be used even in brake systems of motor vehicles having self-levelling suspensions of the type with air springs.

FIGS. 3 and 4 show a second embodiment of the regulating device 4 for the braking force applied to the rear wheels. Again in this embodiment, the regulating device includes a brake corrector 10 of the type illustrated in FIG. 2 and having in particular an inlet 10a for connection to the master cylinder and an outlet 10b for connection to the hydraulic brake actuators 6 associated with the rear wheels. This brake corrector 10 further includes a control member 10c illustrated in broken outline in FIG. 3 and in full outline in FIG. 4.

The body of the brake corrector 10 is fixed to a plate-shaped support 30 by screws 31. The plate 30 is intended to be fixed in its turn to the structure of the motor vehicle.

The regulating device 4 shown in FIGS. 3 and 4 further includes a control device 112 including a single-acting pneumatic cylinder 32 the body 33 of which is fixed to the plate 30 by screws 34. Sealingly slidable in the body 33 is a cup-shaped piston 35 to which is connected a rod 36 sealingly slidable through an aperture 33a formed in one end of the body. The free end of this rod is articulated at 37 to a first end of a control lever 38. The other end of this lever is slidable in a diametral passage in a support 39 rotatable in the apertures formed in two facing appendages 40 integral with the body of the brake corrector 10. The control lever 38 thus faces and can cooperate with the control member 10c of the brake corrector 10.

The body 33 of the pneumatic cylinder 32 has an inlet 33b for connection by lines 9 to the chambers within the air springs 7 of the rear suspensions of the vehicle. In the embodiment illustrated, the inlet 7 is formed in the end wall of the body 33 in which the aperture 33a for the rod 36 is arranged. In the opposite end wall of this body is formed a screw-threaded aperture 33c into which is screwed a threaded rod 41 (FIG. 3). A helical spring 42 is disposed within the body of the cylinder 32 and acts at one end against the piston 35 and at the other end against a cup-shaped body 43 disposed around the end of the threaded rod 41 within the body of the cylinder 32. The spring 42 biasses the piston 35 towards the travel limit position shown in FIG. 3. The force exerted by this spring on the piston may be adjusted by means of the threaded rod 41.

In operation, a pressure increase in one or both of the air springs 7 of the rear suspensions of the motor vehicle results in an increase in the pressure exerted on the piston 35. If this increase is such as to overcome the resistance of the spring 42, the piston 35 moves towards the right (for an observer of FIG. 3) and the rod 36 causes the control lever 38 to rotate, causing a corresponding movement of the control member 10c inwardly of the body of the brake corrector 10. The division of the braking force between the front and rear axles may thus be made subservient to the variations in the load bearing on the rear axle of the vehicle.

Conveniently, the screws 34 for fixing the body of the cylinder 32 to the plate 30 extend through a slot 45 in this plate, as shown in particular in FIG. 3. According to the position in which the pneumatic cylinder 32 is fixed to the plate 30 relative to the brake corrector 10, the control lever 38 has a different effective arm or length. This possibility of adjustment and the possibility of regulating the load of the biassing spring 42 makes the device shown in FIGS. 3 and 4 suitable for use in motor vehicles having different characteristics.

Naturally, the principle of the invention remaining the same, the forms of embodiment and details of construction may be varied widely with respect to those described and illustrated purely by way of non-limiting example, without thereby departing from the scope of the present invention.

We claim:

1. A brake system for motor vehicles having suspensions with air springs, including a respective hydraulic brake actuator for each wheel, a brake corrector device of the variable operating pressure type connected in a control circuit for the actuators associated with the wheels of one axle of the vehicle, and including a movable control member for regulating the operating pressure of the corrector in dependence on the force acting on said member, and further including control means for applying to the control member of the corrector a force which is variable in dependence on the air pressure in the air springs of the suspensions of the motor vehicle;

wherein the control means comprise a hollow body which is coupled to the brake corrector and in which there is formed a chamber divided, by first and second resiliently deformable diaphragms, into two sub-chambers having respective inlets communicating with the chamber of an air spring of a respective suspension of the vehicle, the diaphragms being connected to a drive body which can effect a movement of the control member of the brake corrector as a result of the deformation of at least one of the diaphragms following a corresponding variation in the pressure in at least one of the sub-chambers, and wherein the hollow body comprises:

first and second substantially cup-shaped end bodies having apertures in their respective bottom walls, and a tubular body having a side aperture interposed between the end bodies;

each diaphragm being gripped between the intermediate body and one of the end bodies, one of the sub-chambers being defined between the first end body and the diaphragm facing it, and the other being defined by the intermediate body and the other diaphragm;

the control body being arranged in the intermediate tubular body between the diaphragms so as to be movable along the axis of the intermediate body;

an operating member for cooperating with the control member of the brake corrector being mounted in the second cup-shaped body and being movable through the aperture in the cup-shaped body;

a biasing spring being located in the second cup-shaped body between the base wall and the diaphragm facing it, the spring biasing the control body and the operating member towards the first cup-shaped body.

2. A system according to claim 1, wherein the second cup-shaped body has an integral attachment appendage for allowing it to be fixed to the body of the brake corrector so that the operating member faces the control member of the brake corrector.

* * * * *